United States Patent [15] 3,687,582
Hendry et al. [45] Aug. 29, 1972

[54] APPARATUS FOR FLOWING GAS INTO PLASTICIZED MATERIAL

[72] Inventors: James W. Hendry, Helena; Jack E. Kimball; Charles L. D. Chin, both of Fremont, all of Ohio

[73] Assignee: Borg-Warner Corporation, Chicago, Ill.

[22] Filed: June 8, 1970

[21] Appl. No.: 44,448

[52] U.S. Cl. ..................425/4, 425/200, 425/817
[51] Int. Cl. .................................................B29f 1/02
[58] Field of Search........18/30 AM, 30 AC, 30 AR, 30 JM, 18/30 JT, 30 N, 12 SN; 259/4

[56] References Cited

UNITED STATES PATENTS

| | | | |
|---|---|---|---|
| 3,316,335 | 4/1967 | Snella et al. | 18/12 SN X |
| 2,895,167 | 7/1959 | Paggi | 18/30 JT |
| 2,367,144 | 1/1945 | Shaver | 18/30 JT |
| 2,358,354 | 9/1944 | Stacy et al. | 18/30 JT |
| 3,160,688 | 12/1964 | Aykanian et al. | 18/12 SN X |
| 3,344,215 | 9/1967 | Witz et al. | 18/12 SN UX |

FOREIGN PATENTS OR APPLICATIONS

| | | | |
|---|---|---|---|
| 1,159,247 | 6/1958 | France | 18/30 AC |

*Primary Examiner*—J. Spencer Overholser
*Assistant Examiner*—Michael O. Sutton
*Attorney*—James G. Watterson and Watts, Hoffmann, Fisher, Heinke, Raney, Raney, Collins & Burge

[57] ABSTRACT

Apparatus is provided in the form of a housing having a passage therethrough for the flow of plasticized plastic from a plasticizer to an accumulating chamber connected to a molding apparatus and into which a foaming gas is flowed. A check valve insures flow of the plastic in the one direction. Means in the passage are provided for causing turbulence in the gas-plastic mixture to insure mixing thereof.

14 Claims, 11 Drawing Figures

PATENTED AUG 29 1972 3,687,582

INVENTORS
James W. Hendry
Jack E. Kimball
Charles L. D. Chin

BY Aubrey L. Burger
ATTORNEY

INVENTORS
James W. Hendry
Jack E. Kimball
Charles L. D. Chin
BY
Aubrey L. Burgess
ATTORNEY 3,687,582

APPARATUS FOR FLOWING GAS INTO PLASTICIZED MATERIAL

BACKGROUND OF THE INVENTION

It is known in the art to mold plastic articles having a solid skin and a foamed interior. This process requires mixing of a foaming agent with molten plastic material which is injected into a mold. In any event, the foaming agent, which may be gas yielding, heat decomposable solid materials, such as azo, N-nitroso, carbonate and sulfonyl hydrazide compounds, or gas, such as carbon dioxide and nitrogen, must be introduced into the plastic material. Introduction of the foaming agent has been accomplished in he mold itself, or into a plastic charge in an accumulator. After introduction of the foaming agent, the mixture is molded.

THE INVENTION

According to this invention, an apparatus is provided which comprises a housing having a passage therethrough for the flow of plasticized plastic for example, an ABS plastic, from a plasticizer to an accumulating chamber and then to a molding apparatus. The passage preferably is provided with a check valve permitting flow of the plasticized plastic in the one direction. A gas inlet means opens into the housing and is connected to a source of pressurized gas, such as nitrogen, freon or helium, and the foaming gas is introduced at multiple locations in to the stream of plasticized plastic flowing through the housing. Means, for example, a pineapple-spreader, or a torpedo and reduced passageways, and/or the combination of these means, are provided for causing turbulence in the passageway and thus mixing of the plasticized plastic and the foaming gas for delivery to the accumulating chamber. The arrangement for mixing the gas and the plasticized plastic substantially prevents gas flow along the outer surface of the plasticized plastic mass as a gaseous layer and its eventual escape into the atmosphere. After mixing, the plasticized plastic-gas mixture is molded.

THE DRAWINGS

THE PREFERRED EMBODIMENTS

Figure 1:
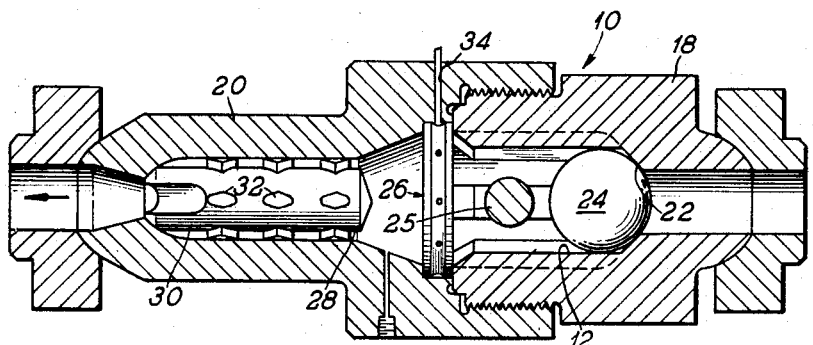
FIG. 1 is a sectional view through one embodiment of the apparatus of this invention wherein a dispersion disc is used.
Figure 11:
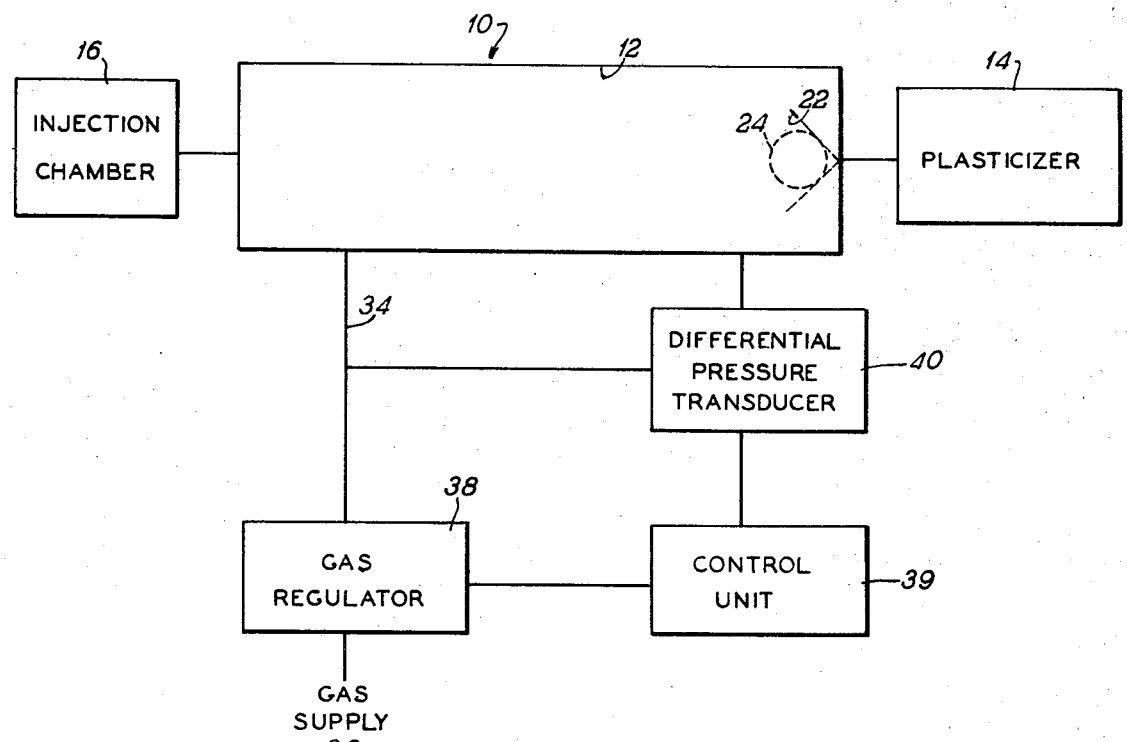
FIG. 11 is a diagrammatic view of the general arrangement of elements according to this invention.

FIG. 1 illustrates a first embodiment of the apparatus of the invention, used in the general arrangement schematically illustrated in FIG. 11. Reference will be made to both figures. FIG. 1 shows a two-part housing 10 having a main central passage 12 therethrough for the flow of plasticized plastic from a plasticizer, schematically indicated at 14 in FIG. 11 to an accumulation chamber, and then to a molding apparatus, which in this embodiment is an injection molding apparatus, schematically indicated at 16 in FIG. 11. Any known plasticizer and accumulating chamber can be used, thus more detailed description of these parts is not deemed necessary.

The housing 10 is constructed of a first part 18 and a second part 20 bolted or other secured in assembled relationship. The part 18 includes a valve seat 22 and a ball check valve 24 which permits flow of plasticized material from the plasticizer 14 in one direction only, i. e., toward the chamber 16. A rod 25 transverse of the passage 20 limits the travel of the ball 24.

Between the parts 18 and 20 is a dispersion disc 26 which will be later described in detail and with respect to more than one embodiment thereof. Suffice to say at this time that the dispersion discs have passages for the passage of plasticized plastic and inlets or passages for the introduction of the foaming gas into the plasticized plastic.

A pineapple-type spreader 28 (so named because of its resemblance to a pineapple) is disposed in the passage 12, and in the flow path of the plasticized plastic and the injected foaming gas.

The pineapple-type spreader 28 has a cylindrical body 30 of less diameter than the passage 12 and a plurality of extending lugs 32, which may be diamond shape, as illustrated, for causing turbulence in the plastic-gas mixture flowing therealong to the injection chamber. The important feature of the spreader is to provide for turbulence in the gas-plastic mixture — the particular shape of the member to accomplish this is not important except to provide the function.

Figure 2:
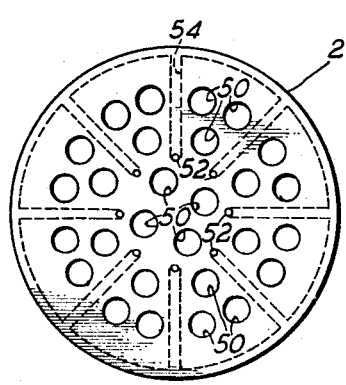
FIG. 2 is a front view of one form of a dispersion disc usable in the FIG. 1 structure.
Figure 3:
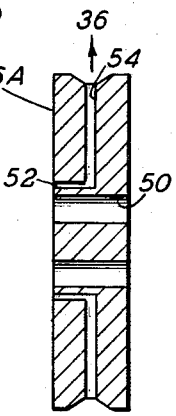
FIG. 3 is a view taken on line 3—3 of FIG. 2.

As indicated in FIG. 11, (and taken with FIG. 1) the housing 10 is drilled, as necessary, to provide at least one duct such as 34 for connection to the gas source, schematically indicated at 36. A gas, such as nitrogen, freon or helium is injected at multiple locations in the stream of plasticized material flowing through the passage 20. A gas pressure regulator 38 is located between the source 36 and the duct 34 and is connected to a control unit 39. A differential pressure transducer 40 is connected to the gas line between the duct 34 and the gas regulator 38, to the passage 12 and also to the control unit 39. This arrangement permits maintenance of a desired pressure differential between the gas injected into the plastic material and the plastic itself, to avoid flow of plastic to the gas source. One form of a dispersion disc, which is generally identified as 26 in FIG. 1, is illustrated in FIGS. 2 and 3. Here the disc is identified as 26A. The disc 26A has a plurality of openings or passageways 50 therethrough for the passage of the plasticized plastic and a plurality of gas inlets 52 for the injection of the foaming gas into the plastic. The gas inlets 52 are placed inwardly of the majority of the passageways 50, so that the gas is trapped within the plastic mass for mixing therewith.

To supply gas to the inlets 52, radial ducts 54 are provided which communicate ultimately with the gas source 36.

Figure 4:
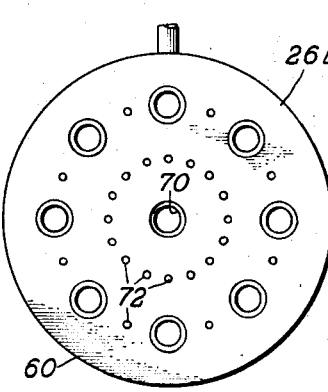
FIG. 4 is a front view of another form of dispersion disc usable in the FIG. 1 structure.
Figure 5:
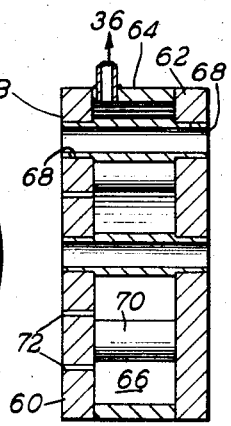
FIG. 5 is a view taken on line 5—5 of FIG. 4.

Another form of a dispersion disc is illustrated in FIGS. 4 and 5 and is identified as 26B. Generally, the discs 26A and 26B are similar; disc 26B is constructed of spaced plates 60, 62 and a circular, cylindrical spacing member 64, forming a cavity 66 connected to the gas source 36. The plates 60 and 62 are provided with openings 68 joined with hollow spacers 70 for the passage of plasticized plastic. The plate 62 is provided with openings 72 for the passage of the foaming gas into the plasticized plastic flowing through the hollow spacers 70.

The spacing and disposition of the openings and passages in both forms of disc can be as desired or as required for proper mixing of the plastic and the gas. However, it has been found that a single gas inlet in the middle of the disc is not sufficient for the desired purpose and gas inlets outwardly of the passageways results in a flow of gas around the plastic mass. Preferably the gas inlets are clustered in the central area of the disc; generally, they are clustered in the central third or half of the disc with the exact area dependent on the particular viscosity of the plastic being processed and the amount of gas being used.

Figure 6:
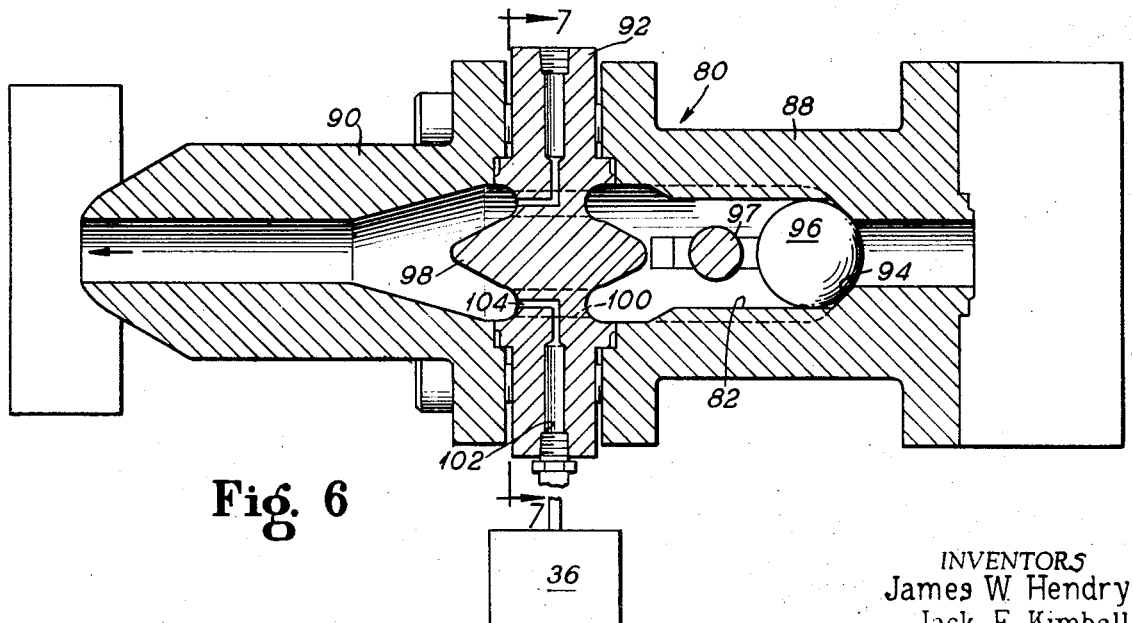
FIG. 6 is a sectional view through another embodiment of the apparatus of this invention.
Figure 7:
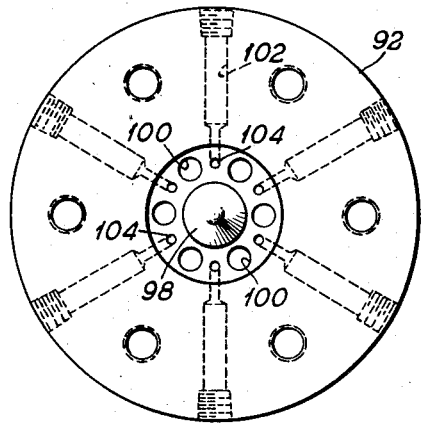
FIG. 7 is a view taken on line 7—7 of FIG. 6.

FIGS. 6 and 7 illustrate another embodiment of the apparatus of this invention comprising generally a housing 80 having a passage 82 therethrough for the flow of plasticized material from the plasticizer, 14 to the chamber 16.

The housing 80 is constructed of a first part 88, a second part 90 and a central part 92. The parts 88, 90 and 92 are bolted or other secured in assembled relationship. The part 88 includes a valve seat 94 and a ball check valve 96 which permits flow of plasticized material from the plasticizer 14 in one direction only, i.e., toward the chamber 16. A rod or pin 97 transverse of the passage 82 limits the movement of the ball 96. The part 90 leads into the chamber 16. The central part 92 is substantially circular in section and contains a central torpedo-shaped portion 98 disposed in the passage 82. Reduced section passages 100 are circumferentially provided about the portion 98 for permitting plastic material to flow about the portion 98. Radial passageways or gas inlet ports 102 are provided joining with circumferential passageways 104 opening downstream (as the plastic flows) of the passages 100 for the flow of gas from the source 36 connected to the radial passageways or ports 102. It is to be noted that the gas passageways 104 are circumferentially spaced from the passages 100 to allow mixing of the gas with the plastic downstream of the passages 100.

Figure 9:
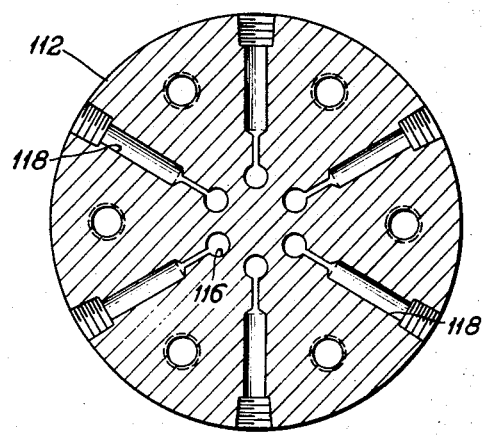
FIG. 9 is a view taken on line 9—9 of FIG. 7.
Figure 8:
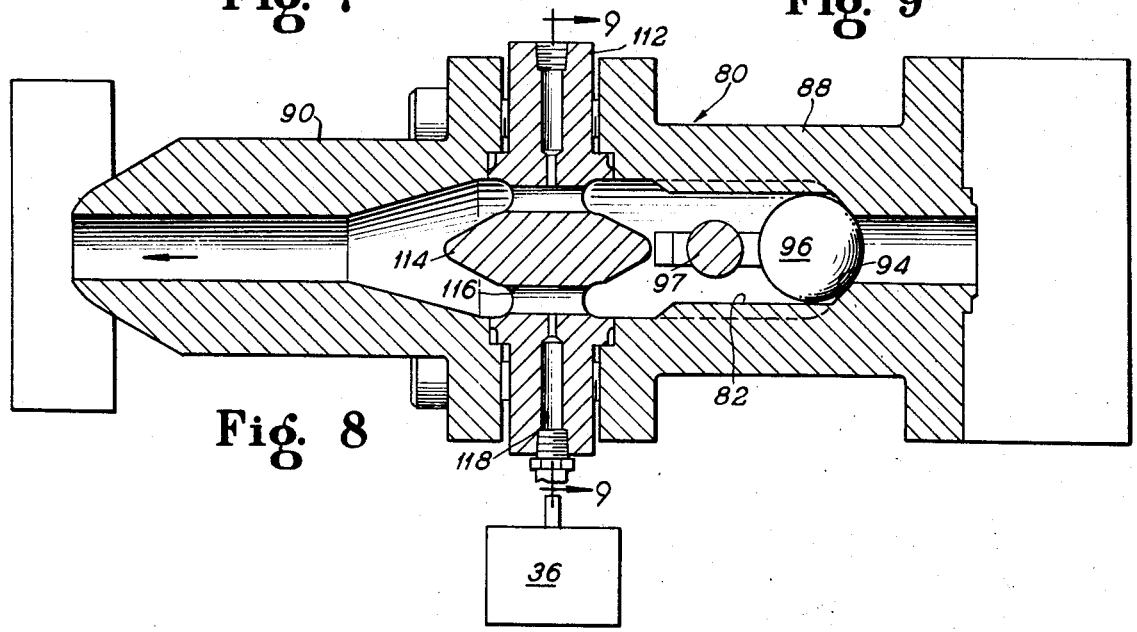
FIG. 8 is a sectional view through still another embodiment of this invention.

Attention is now directed to FIGS. 8 and 9 illustrating another embodiment of the apparatus of the invention. The main difference between the embodiments of FIGS. 6 and 7, and FIGS. 8 and 9 is the construction of the central part, here identified as 112, the other parts being identified with like reference characters.

The central part 112 is substantially circular in section and contains a central torpedo shaped portion 114 disposed in the passage 82. Reduced section passages 116 are circumferentially provided about the portion 114 for permitting plastic material to flow about the portion 112.

Radial passageways or gas inlet ports 118 communicate directly with the passageways for the flow of the foaming gas from the source 36 into the plastic material flowing through the passageways 116, thus being mixed for flow into the chamber 16.

Figure 10:
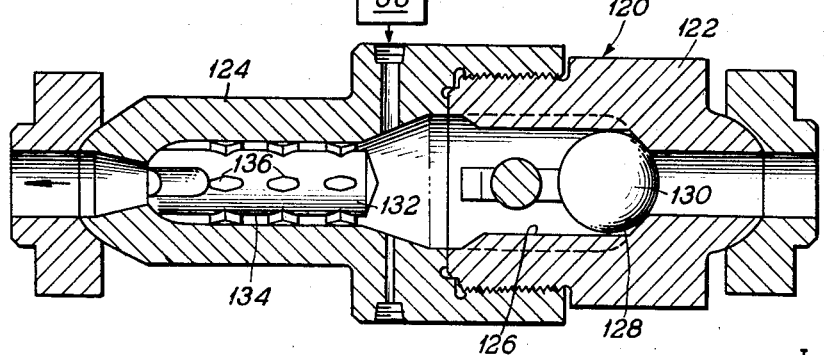
FIG. 10 is a sectional view through still another embodiment of the invention.

FIG. 10 shows another embodiment which comprises a housing 120 of two piece construction, namely parts 122 and 124 suitably joined together and defining a passage 126 for the flow of plasticized material from the plasticizer 14 to the chamber 16. The part 122 is provided with a seat 128 for the ball check valve 130 permitting flow in one direction while a pineapple-type spreader 132 is contained in the part 124. The pineapple-type spreader has a body portion 134 of less dimensions than the passage 126 with lugs 136 (which may be diamond shaped) therein for mixing the gas and plastic material passing to the chamber 16. Radial passages are provided up stream (as the plastic flows) of the spreader for flowing gas from the source 36 into the passage 126 and into the material flowing therethrough.

In operation, plastic material is plasticized in the plasticizer, and forced through the ball check valve into the zone where the gas foaming agent is injected; the plastic and gas are mixed and delivered to the chamber for molding.

In any event the gas inlet pressure must be above the pressure of the plasticized plastic to prevent or substantially eliminate the tendency of the plastic to flow into the foaming gas inlets and the inlet line. Generally the magnitude of pressure differential between the gas inlet pressure and the pressure of the plasticized material required is approximately 20 psi and above. One caution, the gas pressure should not be sufficiently high as to form pockets in the material and/or to move the plastic molding ram.

FIG. 11 as previously stated, shows a schematic of the apparatus described which, if considered together with the various embodiments, indicates the general arrangement of parts.

Here the parts are identified with the same reference characters as used in FIG. 1. As a specific example, a dispersion disc is located in a 2 inch diameter passage and is provided with thirty (30) openings 3/16 inch in diameter for the flow of plasticized plastic therethrough, and thirteen (13) openings 0.012 inch in diameter clustered in the center of the disc for the flow of gas into the passage. A pressure differential of about 20 psi is maintained between the pressure of the gas and that of the plastic. This arrangement has proved successful.

We claim:

1. Apparatus for injecting or introducing a gaseous foaming agent into a mass of foamable plasticized plastic prior to being molded comprising:

a housing;

a passage through said housing and connected at its opposite ends to a plasticizer and an accumulating chamber respectively, for the flow of plasticized plastic therethrough;

means, including a torpedo and reduced passageways, in said passage for causing turbulence in plasticized plastic flowing therethrough; and gas inlet means into said passage, located at the downstream end of said reduced passageways, and connected to a source of pressurized gas for introducing gas to said flowing plastic for mixing therewith.

2. Apparatus for injecting or introducing a gaseous foaming agent into a mass of foamable plasticized plastic prior to being molded comprising:
a housing;
a passageway through said housing and connected at its opposite ends to a plasticizer and an accumulating chamber respectively, for the flow of plasticized plastic therethrough;
means, including a torpedo and reduced passageways, in said passage for causing turbulence in plasticized plastic flowing therethrough; and
gas inlet means into said passage, located between terminal ends of said reduced passageways, and connected to a source of pressurized gas for introducing gas to said flowing plastic for mixing therewith.

3. Apparatus as recited in claim 2 further including means for maintaining the pressure of said gas above the pressure of the flowing plasticized plastic.

4. Apparatus as recited in claim 2 further including:
means to measure the pressure of the gas;
means to measure the pressure of the flowing plastic; and
means to maintain a determined pressure differential between the pressure of said gas and the pressure of said plastic.

5. Apparatus for injecting or introducing a gaseous foaming agent into a mass of foamable plasticized plastic prior to being molded comprising:
a housing;
a passage through said housing and connected at its opposite ends to a plasticizer and an accumulating chamber respectively, for the flow of plasticized plastic therethrough;
means comprising a dispersion disc having a plurality of passageways therethrough for the flow of plasticized plastic, inlet means for the introduction of gas and gas ducts of smaller dimensions than said passageways for discharging gas to said passage; and
means for injecting gas through said gas ducts and into plastic that flows through said plurality of openings;
said gas inlets being at least partially surrounded by a portion of said plurality of openings.

6. Apparatus as recited in claim 5 wherein said gas inlets are centrally clustered with respect to the area of said disc.

7. Apparatus as recited in claim 6 wherein said gas inlets are clustered in the central half of the area of said disc.

8. Apparatus as recited in claim 5 further including means for maintaining the pressure of said gas above the pressure of the flowing plasticized plastic.

9. Apparatus as recited in claim 5 further including:
means to measure the pressure of the gas;
means to measure the pressure of the flowing plastic; and
means to maintain a determined pressure differential between the pressure of said gas and the pressure of said plastic.

10. Apparatus for injecting or introducing a gaseous foaming agent into a mass of foamable plasticized plastic prior to being molded comprising:
a housing;
a passage through said housing and connected at its opposite ends to a plasticizer and an accumulating chamber respectively, for the flow of plasticized plastic therethrough;
means comprising a dispersion disc having spaced walls defining a cavity;
means defining openings passing through said walls and said cavity for the flow of plasticized material therethrough;
gas inlet means into said cavity for the introduction of gas thereto; and
gas inlets in one of said walls for the passage of gas into plasticized material flowing through said opening-defining means;
said gas inlets being at least partially surrounded by a portion of said opening-defining means.

11. Apparatus for injecting or introducing a gaseous foaming agent into a mass of foamable plasticized plastic prior to being molded comprising:
a housing having an elongated through passage for the flow of plasticized material,
a plasticizer connected to said housing and communicating with one end of said passage for supplying plasticized material to and moving it through said passage,
structure defining an accumulating chamber for plasticized material connected to said housing and communicating with an opposite end of said passage for receiving plasticized material,
a gas inlet opening into said passage, and
means in said passage downstream from said gas inlet considered in the direction of material movement through the passage for causing plasticized material moving through the passage to separate and rejoin at a plurality of locations along the passage, said means comprising a central body portion of smaller diameter than the passage and elongated longitudinally of the passage and a plurality of lugs extending from the body portion at locations spaced peripherally about and longitudinally of the central body portion.

12. Apparatus as recited in claim 11 further including a baffle within said passage with openings therethrough that permit movement of material longitudinally of the passage and with a plurality of discrete transverse bores within the baffle extending from a peripheral portion thereof and opening into communication with the passage, for introduction of gas.

13. Apparatus as recited in claim 12 wherein said bores open into communication with said passage on the downstream side of the baffle.

14. Apparatus as recited in claim 12 wherein said bores open into communication with the passage at locations at least partially surrounded by a portion of said apertures.

* * * * *